(12) United States Patent
Tholinsson et al.

(10) Patent No.: US 12,151,323 B2
(45) Date of Patent: Nov. 26, 2024

(54) METHOD OF MANUFACTURING A FIXED SQUARE

(71) Applicant: HULTAFORS GROUP AB, Bollebygd (SE)

(72) Inventors: Patrik Tholinsson, Bollebygd (SE); Göran Andersson, Borås (SE)

(73) Assignee: HULTAFORS GROUP AB, Bollebygd (SE)

( * ) Notice: Subject to any disclaimer, the term of this patent is extended or adjusted under 35 U.S.C. 154(b) by 0 days.

(21) Appl. No.: 18/608,284

(22) Filed: Mar. 18, 2024

(65) Prior Publication Data
US 2024/0316702 A1    Sep. 26, 2024

(30) Foreign Application Priority Data
Mar. 21, 2023   (EP) ..................................... 23163202

(51) Int. Cl.
*B23P 19/04*   (2006.01)
(52) U.S. Cl.
CPC ..................... *B23P 19/04* (2013.01)
(58) Field of Classification Search
CPC . B23P 19/04; G01B 3/566; G01B 3/02; B43L 7/12; B43L 7/02; F16C 2370/00; B25H 7/00; B25H 7/02; B27G 23/00
See application file for complete search history.

(56) References Cited

U.S. PATENT DOCUMENTS

| | | | | |
|---|---|---|---|---|
| 2,139,243 | A | * 12/1938 | Mohr ..................... | G01B 3/566 33/480 |
| 2,246,260 | A | * 6/1941 | McGrath ................ | G01B 3/566 33/480 |
| 2015/0086285 | A1 | 3/2015 | Norman | |

FOREIGN PATENT DOCUMENTS

| | | |
|---|---|---|
| DE | 1623155 A1 | 3/1971 |
| GB | 1253266 A | 11/1971 |
| GB | 2072353 A | 9/1981 |

OTHER PUBLICATIONS

Extended European Search Report for co-pending EP 23163202.7, 9 pp., Aug. 21, 2023.

* cited by examiner

*Primary Examiner* — Jason L Vaughan
*Assistant Examiner* — Amanda Kreiling
(74) *Attorney, Agent, or Firm* — Kagan Binder, PLLC

(57) ABSTRACT

A method of manufacturing a fixed square includes providing a blade of the square, where the blade includes at least three first holes; providing a stock of the square, where the stock includes at least three second holes corresponding to the at least three first holes of the blade for attaching the blade and the stock to each other; holding the provided blade and stock in a fixture in a right angle relationship where the at least three first holes of the blade align with the at least three second holes of the stock; enlarging the at least three first and second holes while the blade and the stock are held in the fixture; and attaching the blade and the stock to each other using fastening elements in the at least three enlarged first and second holes while the blade and the stock are held in the fixture.

15 Claims, 5 Drawing Sheets

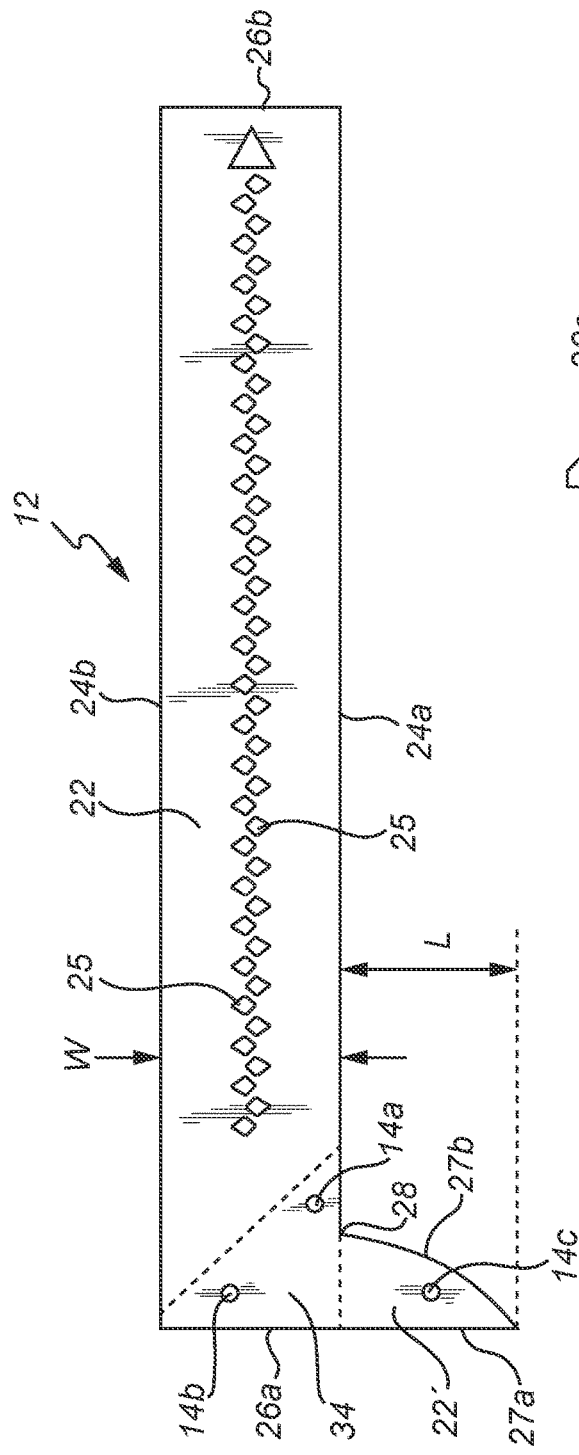
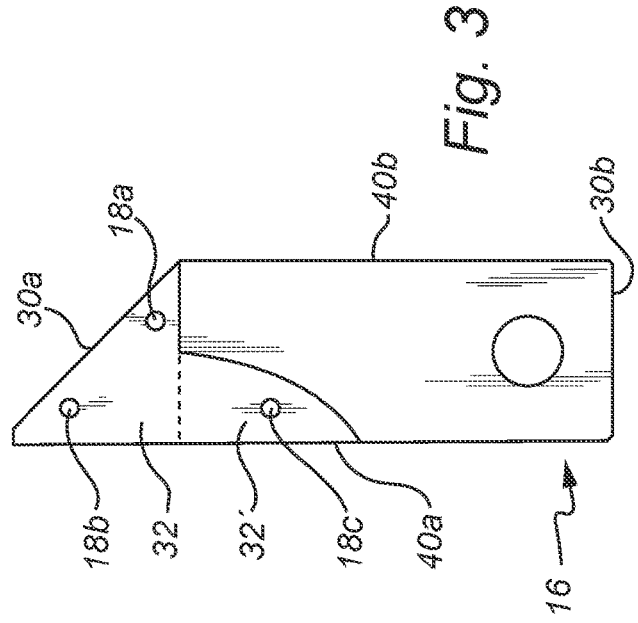

METHOD OF MANUFACTURING A FIXED SQUARE

CROSS-REFERENCE TO RELATED APPLICATIONS

This application claims priority to European Application No. 23163202.7, filed Mar. 21, 2023 and titled "METHOD OF MANUFACTURING A FIXED SQUARE," which is incorporated herein by reference in its entirety.

TECHNICAL FIELD

The present invention relates to a method of manufacturing a fixed square. The present invention also relates to a fixed square, in particular for use in carpentry, which fixed square may be manufactured by said method.

BACKGROUND ART

A square is generally an instrument having at least one right angle and two straight edges used especially to lay out or test right angles. It may also be referred to a carpenter's square.

A non-adjustable or fixed square has a (longer) blade and a (shorter) stock which meet at a fixed angle of 90 degrees. The whole square could be made of steel, or the blade could be made stainless of steel while the stock is made of plastic, for example. The blade is typically marked with units of length, such as centimeters.

In a conventional method of manufacturing a fixed square, the blade and the stock are placed and fixed in a right angle relationship in a fixture. Then three holes are drilled through the blade and the stock, and thereafter three pins are inserted into the drilled holes to join the blade and the stock. The three holes/pins of conventional fixed squares are typically arranged in a triangular configuration at the top of the stock, as in GB1253266 (A).

SUMMARY OF THE INVENTION

The above-mentioned conventional method of manufacturing a fixed square may be difficult to perform correctly, since very accurate production equipment is needed to meet tight tolerances. It is also a challenge to work/drill in two usually different materials (i.e. the material of the blade and the material of the stock) using the same tool and achieve a precise result. Hence, there is a risk that the conventional method leads to low yield in manufacturing. Also, the three holes/pins of conventional fixed squares may not be able to keep the blade at 90 degrees to the stock over time.

It is an object of the present invention to overcome or alleviate at least some of these problems, and to provide an improved method of manufacturing a fixed square.

According to a first aspect of the invention, this and other objects are achieved by a method of manufacturing a fixed square, wherein the method comprises: providing a blade of the square, wherein the blade has at least three first holes; providing a stock (handle) of the square, wherein the stock has at least three second holes corresponding to the at least three first holes of the blade for attaching the blade and the stock to each other; holding the provided blade and stock in a fixture in a right angle relationship where the at least three first holes of the blade (substantially) align with the at least three second holes of the stock; enlarging the at least three first and second holes while the blade and the stock are held in the fixture; and attaching the blade and the stock to each other using fastening elements (inserted) in the at least three enlarged first and second holes while the blade and the stock are held in the fixture.

The present invention is at least partly based on the understanding that by having pre-made holes in the blade and stock, the amount of shavings when enlarging the holes may be reduced compared to drilling in the above-mentioned conventional method without any pre-made holes. Since the attachment using the fastening elements is made in the same fixture as the enlargement, the lower amount of shavings leads to a clean environment, which in turn means that an accurate attachment of the blade and the stock may be achieved. Furthermore, because of the enlarged holes and correspondingly large(r) fastening elements, the square also becomes very strong. This manufactured fixed square could be dropped to the ground from a high altitude without affecting the angular accuracy of the square.

The fastening elements may be pins. The pins may be secured by means of interference fit. Pins are simple and cheap, and have very high accuracy and work well with very accurate holes. Alternatively, the fastening elements could be rivets or screws, for example. The number of fastening elements may for example be three; one per each pair of first and second enlarged holes.

The at least three first and second holes may be enlarged using a reamer. Namely, the at least three first and second holes may be enlarged using the same reamer. A reamer is a drill (bit) that resembles a twist drill, but the reamer has shallower grooves, which makes the reamer stiffer and can therefore drill straighter holes. The at least three first and second holes may be enlarged (with respect to diameter) about 10-20%, such as 15% or 0.5 mm.

The blade including the least three first holes may be laser-cut. That is, providing the blade may comprise laser-cutting the blade from a blank (typically a sheet) and laser-cutting the least three first holes in the blade, preferably in the same operation/laser-cutting machine. Instead of laser-cutting, water jet cutting could be used to provide the blade including the least three first holes.

The blade may for example be made of stainless steel.

The stock including the at least three second holes may be computer numerical control (CNC) machined, for example milled. That is, providing the stock may comprise CNC machining a blank to form the stock including the at least three second holes (i.e. the at least three second holes are also CNC machined), in a CNC machine. Alternatively, the stock including the at least three second holes could be made by casting.

The stock may for example be made of anodized aluminium.

The stock is preferably made as one piece. In this way, no assembly of the stock is needed.

The blade may have a rectangular main portion with two (parallel) long sides and two (parallel) short sides, the rectangular main portion including two of the at least three first holes, wherein the blade further has a supplemental portion extending from one of the long sides of the rectangular main portion and preferably in the same plane as the rectangular main portion, the supplemental portion including the third hole of the at least three first holes. In this way, the third hole is more separated from the other two holes compared to conventional fixed squares such as the aforementioned GB1253266 (A), which in turn means that the present fixed square may be stronger over time.

The supplemental portion may have a straight back edge aligned with the back short side of the rectangular main portion, wherein the supplemental portion has front edge connecting to the one long side at a position between the two short sides of the rectangular main portion, which position is within the stock when the blade and the stock have been attached to each other.

The supplemental portion of the blade may extend from the one long side a distance which is equal to the length of the short side of the rectangular main portion of the blade. In other words, the length of the supplemental portion is equal to the width of the rectangular main portion of the blade. In this way, waste of material during manufacturing (e.g. laser-cutting) of the blade for the fixed square may be minimized.

The stock may at one end have a slot adapted to accommodate a sub-portion of the rectangular main portion of the blade, and wherein the slot has an extension extending towards the opposite end of the stock for accommodating the supplemental portion of the blade. The extension of the slot of the stock and the supplemental portion of the blade may have matching shapes, to further strengthen the fixed square. However, the extension could alternatively have a different (larger) shape, as long as it can accommodate the supplemental portion.

The slot may be open at a back edge of the stock, whereas a front edge of the stock parallel to the back edge does not have any opening between the rectangular main portion of the blade and the end of the stock opposite the square's heel. The front edge of the stock may instead be (completely) flat, which is a user advantage. Specifically, this may be useful in case one works with thin items such as sheet metal which then can rest against the opening-less front edge. Furthermore, the blade may be inserted from the back (or from the top) into the slot of the stock during manufacturing of the fixed square.

One of said two first holes is situated adjacent the inner corner of the square, wherein the other of said two first holes is situated adjacent the heel of the square, and wherein said third hole is situated along a back edge of the stock and closer to the end of the stock opposite the square's heel than the hole situated adjacent the inner corner of the square. That is, the third hole is more separated from the other two holes compared to conventional fixed squares such as the aforementioned GB1253266 (A), which in turn means that the present fixed square may be stronger over time. "Adjacent" may here be construed as 10-20 mm, such as 15 mm (from the inner corner and the heel, respectively). "Closer" may here be 10-50 mm, preferably 25-50 mm, closer to the end of the stock opposite the square's heel than the hole situated adjacent the inner corner of the square.

According to a second aspect of the present invention, there is provided a fixed square manufactured by the method of the first aspect.

According to a third aspect of the present invention, there is provided a fixed square, in particular for use in carpentry, comprising a blade and a stock in a right angle relationship, wherein: the blade has at least three first holes; the stock has at least three second holes aligned with the at least three first holes; the blade and the stock are attached to each other by at least three fastening elements in the at least three first and second holes; the blade has a rectangular main portion with two long sides and two short sides, the rectangular main portion including two of the at least three first holes, wherein the blade further has a supplemental portion extending from one of the long sides of the rectangular main portion and preferably in the same plane as the rectangular main portion, the supplemental portion including the third hole of the at least three first holes; and the stock at one end has a slot accommodating a sub-portion of the rectangular main portion of the blade, wherein the slot has an extension extending towards the opposite (free) end of the stock, which extension accommodates the supplemental portion of the blade. This fixed square may for example be manufactured by the method of the first aspect. Furthermore, this aspect of the invention may exhibit the same or similar features and technical effects as the first aspect, and vice versa. In particular, the third hole is more separated from the other two holes compared to conventional fixed squares such as the aforementioned GB1253266 (A), which in turn means that the present fixed square may be stronger over time.

BRIEF DESCRIPTION OF THE DRAWINGS

These and other aspects of the present invention will now be described in more detail, with reference to the appended drawings showing one or more embodiments of the invention.

FIG. 2 is a side view of the blade of the fixed square.

FIG. 3 is a side view of the stock of the fixed square.

DETAILED DESCRIPTION

Figure 1:
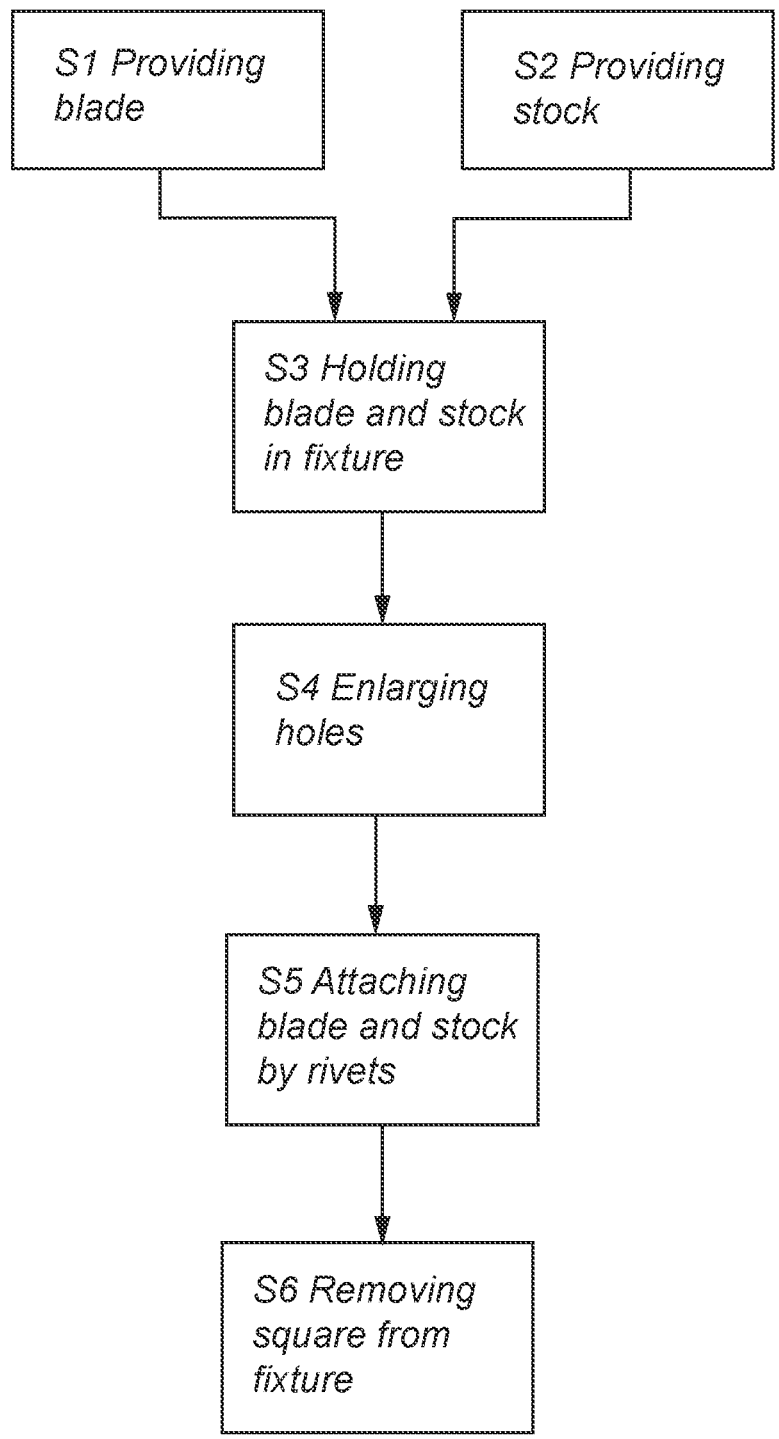
FIG. 1 is a flow chart of a method of manufacturing a fixed square according to an aspect of the present invention.

FIG. 1 is a flow chart of a method of manufacturing a fixed square 10, in particular for use in carpentry or the like, according to an aspect of the present invention. The square 10 could also be referred to as a non-adjustable square 10. The square 10 will comprise a blade 12 and a stock 16 in a fixed, right angle relationship, as see for example in FIG. 6.

At S1, the method comprises providing the blade 12, wherein the provided blade 12 here has three first holes 14*a-c* (no more no less) for attachment to the stock 16, as seen in FIG. 2.

The blade 12 including the three first holes 14*a-c* may be laser-cut. That is, step S1 of providing the blade 12 may comprise laser-cutting the blade 14 from a blank (typically a sheet) and laser-cutting the three first holes 14*a-c* in the blade 12, preferably in the same operation/laser-cutting machine (not shown). The blade 12 may for example be made of stainless steel. Furthermore, the blade 12 may have at least a rectangular main portion 22 with two long sides 24*a-b* and two short sides 26*a-b*. Apart from the three first holes 14*a-c*, the blade 12 may also have one or more marking slots 25, in FIG. 2 two parallel rows of marking slots 25 extending in the length direction of the blade 12. Furthermore, the blade 12 may be marked with units of length (not shown).

At S2, the method comprises providing the stock 16, wherein the provided stock 16 here has three second holes 18*a-c* corresponding to the three first holes 14*a-c* of the blade 12, for attaching the blade 12 and the stock 16 to each other, as seen in FIG. 3. The stock 16 may also be referred to as a handle. Step S2 can be performed before, after, or at the same time as step S1.

Figure 5:
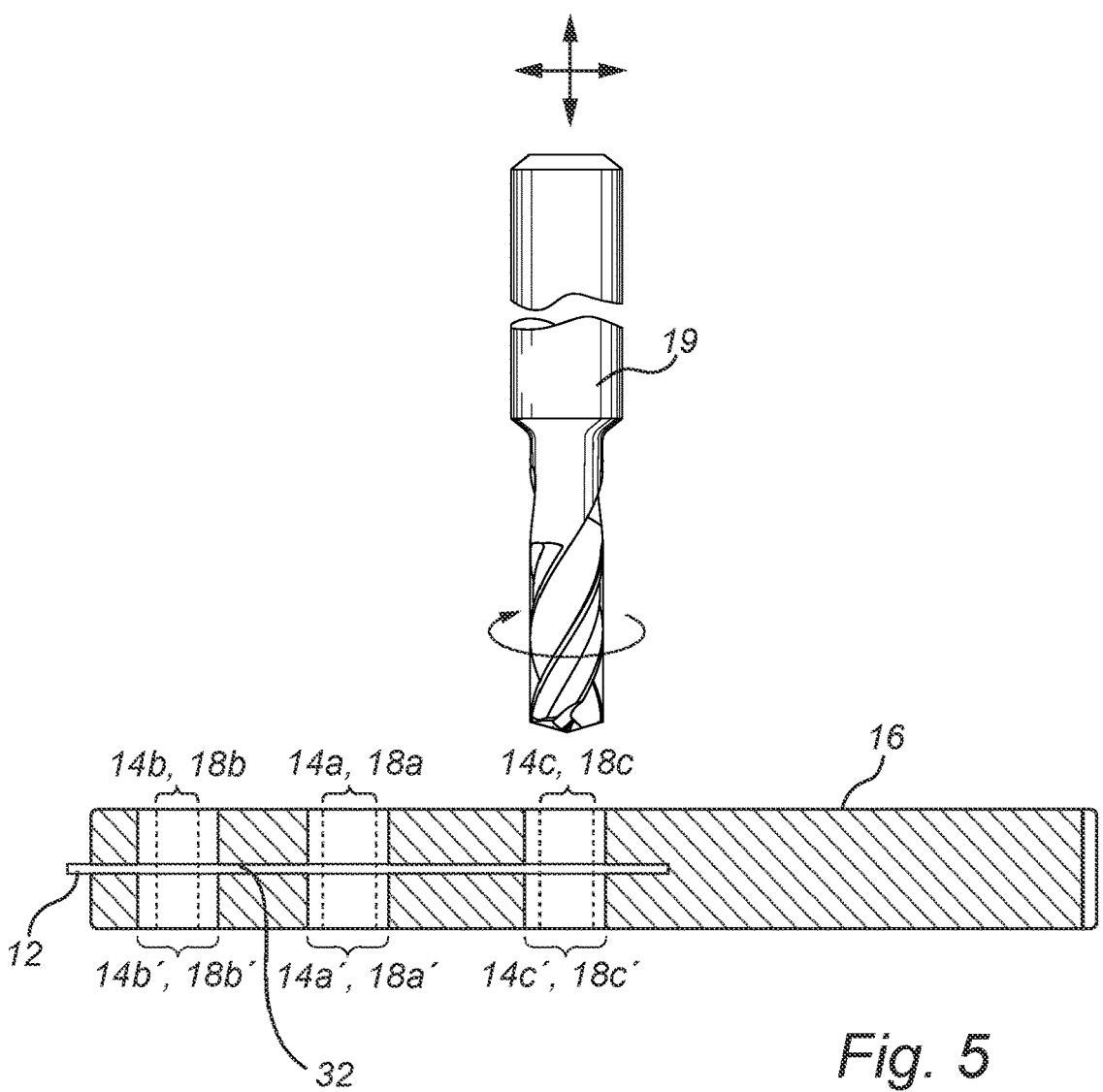
FIG. 5 is a cross-sectional back view along the section indicated in FIG. 4 showing enlarging holes with a reamer.
Figure 7:
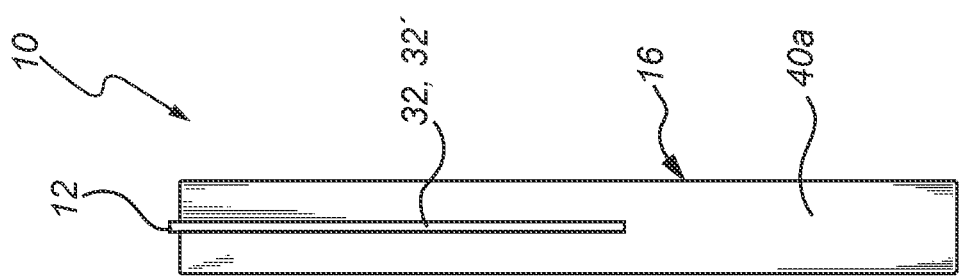
FIG. 7 is a back view of the fixed square.

The stock 16 including the three second holes 18*a-c* may be CNC machined, for example milled. That is, step S2 of providing the stock may comprise CNC machining a blank to form the stock 16 including the three second holes 18*a-c* in a CNC machine (not shown). The stock 16 may for example be made of anodized aluminium. Furthermore, the stock 16 may at one end 30a have a slot 32 adapted to accommodate a sub-portion 34 of the rectangular main portion 22 of the blade 12. The end 30a may be oblique, and the sub-portion 34 may be (substantially) triangular. The slot 32 is preferably a central slot 32, with respect to the thickness of the stock 16, as seen in FIGS. 5 and 7. The stock 16 is preferably made as one piece.

Figure 4:
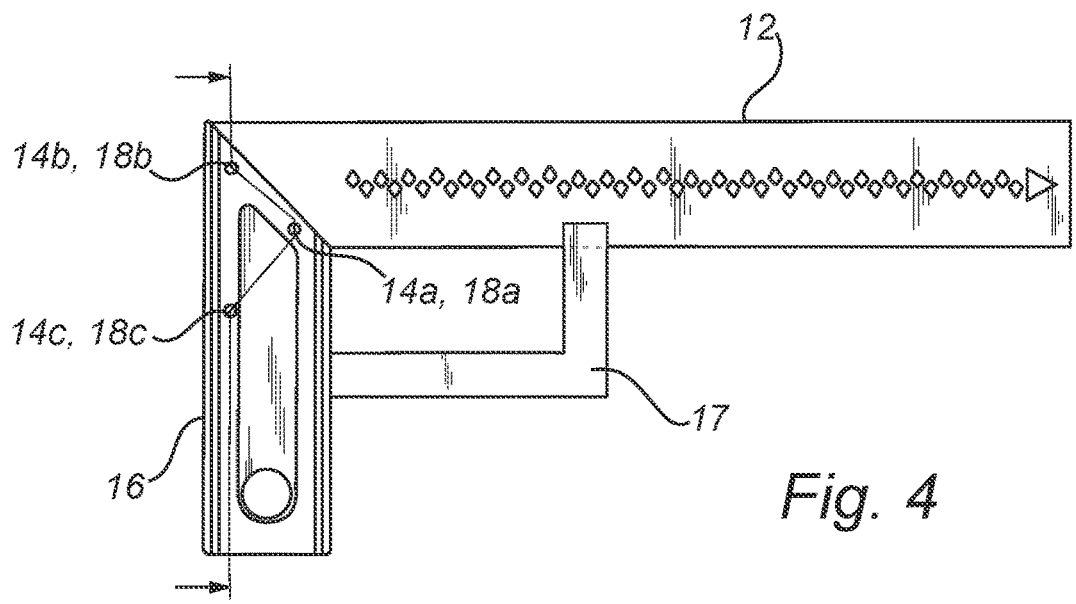
FIG. 4 is a side view of the fixed square during manufacturing.

Following steps S1 and S2, the method at S3 comprises (placing and) holding the provided blade 12 and the provided stock 16 in a fixture 17 in a right angle relationship, where the three first holes 14a-c of the blade 12 align with the three second holes 18a-c of the stock 16, as seen in FIG. 4. That is, in step S3 the fixture 17 may hold/holds the blade 12 and stock 16. The fixture 17, which is only schematically illustrated in FIG. 4, may be referred to as a holding fixture or an assembly fixture. In S3, the sub-portion 34 of the rectangular main portion 22 of the blade 12 is accommodated/placed in the slot 32 of the stock 16.

At S4, the method comprises enlarging the three first and second holes 14a-c and 18a-c, while the blade 12 and the stock 16 are held in/by the fixture 17, as seen in FIG. 5. The resulting enlarged first and second holes are denoted 14a'-c' and 18a'-c'. In FIG. 5 the sizes of the holes 14a-c, 18a-c, 14a'-c' and 18a'-c' are exaggerated for illustrative purposes. The at least three first and second holes 14a-c and 18a-c may be enlarged using a rotating finishing tool, specifically a reamer 19. The reamer 19 is a drill (bit) that resembles a twist drill, but the reamer 19 has shallower grooves. From FIG. 5 it can also be appreciated that each second hole 18a-c (or each enlarged second hole 18a'-c') in the stock 16 can have two portions, one portion on either side of the slot 32.

At S5, the method comprises attaching the blade 12 and the stock 16 to each other by inserting three fastening elements 20a-c in the at least three enlarged first and second holes 14a'-c' and 18a'-c', while the blade 12 and the stock 16 are held in the fixture 17. The fastening elements 20a-c may be pins, and they (or other fastening elements) may be used to attach the blade 12 and the stock 16 to each other in any manner known per se. Specifically, the pins 20a-c may be pressed into the first and second holes 14a'-c' and 18a'-c', and are secured in the first and second holes 14a'-c' and 18a'-c' by means of interference fit. The pins 20a-c are typically not deformed at the ends after they have been inserted.

Figure 6:
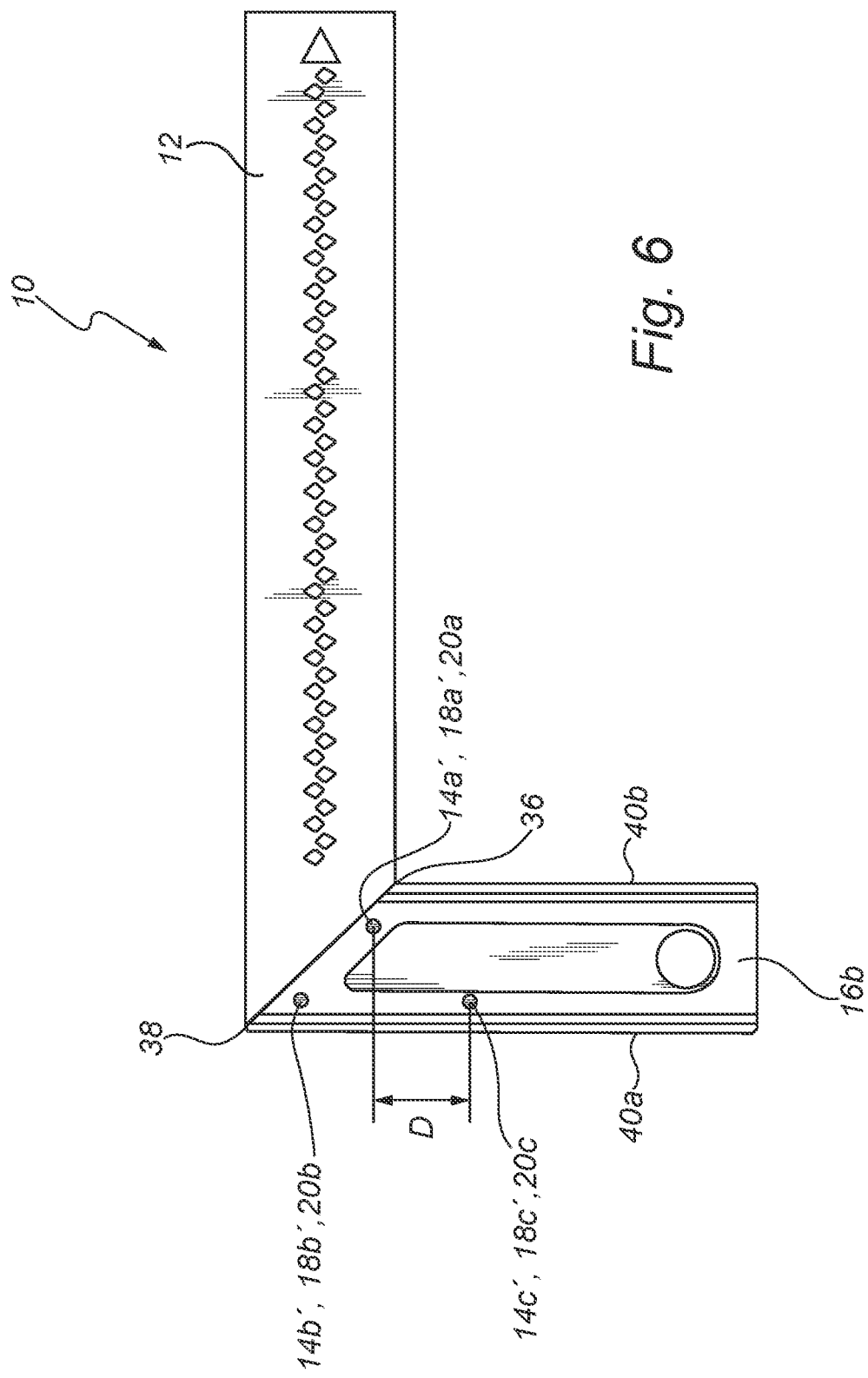
FIG. 6 is a side view of the manufactured fixed square.

At S6, the method may comprise removing the now manufactured fixed square 10 from the fixture 17. An exemplary fixed square 10 manufactured by the method S1-S6 is illustrated in FIG. 6. In FIG. 6, the pins 20a-c are shown; one per each pair of first and second enlarged holes 14a'-c' and 18a'-c'.

In a preferred embodiment, the third attachment point (formed by 14c', 18c' and 20c) is more separated from the other two attachment points (formed by 14a', 18a' and 20a, and 14b', 18b' and 20b, respectively) compared to conventional fixed squares, such as the aforementioned GB1253266 (A), which in turn means that the fixed square 10 may be stronger over time. To this end, in addition of the aforementioned rectangular main portion 22, the blade 12 may further have a supplemental portion 22' extending from one 24a of the long sides of the rectangular main portion 22 and in the same plane as the rectangular main portion 22, wherein the rectangular main portion 22 includes two 14a-b of the three first holes, whereas the supplemental portion 22' includes the third 14c of the three first holes, as shown in FIG. 2. Correspondingly, the slot of the stock 16 has an extension 32' extending towards the opposite/free end 30b of the stock 16 (see FIG. 3), which extension 32' accommodates the supplemental portion 22' of the blade 16 in the manufactured fixed square 10.

In a preferred configuration as illustrated for example in FIG. 6, one 14a, 14a' of said two first holes is situated adjacent the inner corner 36 of the fixed square 10, such as 10-20 mm from the inner corner 36. The other 14b, 14b' of said two first holes is situated adjacent the heel 38 of the fixed square 10, such as 10-20 mm from the heel 38. And said third hole 14c, 14c' is situated along the back edge 40a of the stock 16 and closer to the end 30b of the stock 16 opposite the square's heel 38 than the hole 14a, 14a' situated adjacent the inner corner 36 of the fixed square 10. The third hole 14c, 14c' may for example be in the range of 10-50 mm, preferably 25-50 mm, such as 29 mm (center-to-center), closer to the end 30b than the hole 14a, 14a', as seen in the longitudinal direction of the stock and illustrated by reference sign D in FIG. 6. Hence, the three attachment points may here be arranged in a triangular configuration. But unlike the conventional triangular configuration, as in GB1253266 (A), which is a 45-45-90 right triangle with one cathetus/leg along the back edge of the stock and the other cathetus/leg parallel to the free end of the stock in level with the rectangular blade, in the present triangular configuration one of the attachment points (formed by 14c', 18c' and 20c) is below the rectangular (main portion 22 of the) blade, and closer to the free end 30b of the stock 16 than in the conventional triangular configuration. The present triangular configuration could as well be a 45-45-90 right triangle, but with the hypotenuse along the back edge 40a of the stock 16.

Moving on, the supplemental portion 22' of the blade 16 may have a straight back edge 27a aligned with the back short side 26a of the rectangular main portion 22 of the blade 12, and a front edge 27b connecting to the long side 24a of the rectangular main portion 22 of the blade 12 the at a position 28 between the two short sides 26a-b of the rectangular main portion 22. This position 28 is preferably within the stock 16 when the blade 14 and the stock 16 have been attached to each other, as appreciated e.g. from FIGS. 2-4. The aforementioned extension 32' of the slot 32 in the stock 16 may be formed (milled) using a disc cutter, and the extension 32' may therefore have curved radius at the bottom. To this end, the front edge 27b of the supplemental portion 22' of the blade 16 may be curved, giving the supplemental portion 22' a shark fin-like shape that matches the extension 32' of the slot 32 in the stock 16, as illustrated in FIGS. 2-3. Furthermore, the supplemental portion 22' of the blade 12 preferably extends from the long side 24a of the rectangular main portion 22 a distance L which is equal to the length W of the short side 26a of the rectangular main portion 22 of the blade 12, to reduce material waste during manufacturing (step S1).

Figure 8:
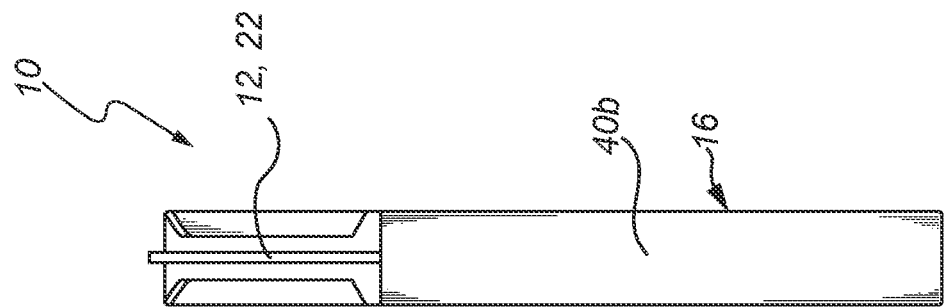
FIG. 8 is a front view of the fixed square.

With further reference to FIGS. 7-8, the slot 32 in the stock 16, including the extension 32', is preferably open at the longitudinal back edge 40a of the stock 16 (see FIGS. 3 and 7), whereas a longitudinal front edge 40b of the stock 16 parallel to the back edge 40a does not have any opening between the rectangular main portion 22 of the blade 12 and the end 30b of the stock 16 opposite the heel 38 of the fixed square 10 (see e.g. FIGS. 3 and 8). The front edge 40b of the stock 16 may instead be straight and completely flat. This may for example be useful in case one works with thin items, such as sheet metal, which then can rest against the openingless front edge.

The person skilled in the art realizes that the present invention by no means is limited to the preferred embodiments described above. On the contrary, many modifications and variations are possible within the scope of the appended claims. For example, the method according to steps S1-S5 or S1-S6 may also be used to manufacture a fixed square without the supplemental portion 22' and extension 32', i.e. all three attachment points may be in (sub-portion 34 of) the rectangular main portion 22 of the blade, similar to more conventional fixed squares. Furthermore, the fixed square with the third attachment point more separated from the other two attachment points could alternatively be manufactured with other methods than S1-S5 or S1-S6, such as the "conventional method" mentioned above in the 'Background art' section.

The invention claimed is:

1. A method of manufacturing a fixed square, wherein the method comprises:
   providing a blade of the square, wherein the blade comprises at least three first holes;
   providing a stock of the square, wherein the stock comprises at least three second holes corresponding to the at least three first holes of the blade for attaching the blade and the stock to each other;
   holding the provided blade and stock in a fixture in a right angle relationship where the at least three first holes of the blade align with the at least three second holes of the stock;
   enlarging the at least three first holes and the at least three second holes while the blade and the stock are held in the fixture; and
   attaching the blade and the stock to each other using fastening elements in the at least three enlarged first holes and the at least three enlarged second holes while the blade and the stock are held in the fixture.

2. The method according to claim 1, wherein the fastening elements are pins.

3. The method according to claim 1, wherein the at least three first holes and the at least three second holes are enlarged using a reamer.

4. The method according to claim 1, wherein the blade including the least three first holes is laser-cut.

5. The method according to claim 1, wherein the blade is made of stainless steel.

6. The method according to claim 1, wherein the stock including the at least three second holes is computer numerical control machined.

7. The method according to claim 1, wherein the stock is made of anodized aluminium.

8. The method according to claim 1, wherein the stock is made as one piece.

9. The method according to claim 1, wherein the blade comprises a rectangular main portion with two long sides and two short sides, the rectangular main portion including two of the at least three first holes, and wherein the blade further comprises a supplemental portion extending from one of the long sides of the rectangular main portion and preferably in the same plane as the rectangular main portion, the supplemental portion including a third hole of the at least three first holes.

10. The method according to claim 9, wherein the supplemental portion comprises a straight back edge aligned with a back short side of the two short sides of the rectangular main portion, and wherein the supplemental portion comprises a front edge connecting to the one long side at a position between the two short sides of the rectangular main portion, which position is within the stock when the blade and the stock have been attached to each other.

11. The method according to claim 9, wherein the supplemental portion of the blade extends from the one long side a distance which is equal to a length of a short side of the rectangular main portion of the blade.

12. The method according to claim 9, wherein the stock at a first end comprises a slot adapted to accommodate a sub-portion of the rectangular main portion of the blade, and wherein the slot comprises an extension extending towards a second end opposite the first end of the stock for accommodating the supplemental portion of the blade.

13. The method according to claim 12, wherein the slot is open at a back edge of the stock, whereas a front edge of the stock parallel to the back edge does not comprise any opening between the rectangular main portion of the blade and the second end of the stock opposite a heel of the square.

14. The method according to claim 13, wherein one of said two first holes of the at least three first holes is situated adjacent an inner corner of the square, wherein the other of said two first holes of the at least three first holes is situated adjacent the heel of the square, and wherein said third hole is situated along a back edge of the stock and closer to the second end of the stock opposite the square's heel than the hole situated adjacent the inner corner of the square.

15. A fixed square, in particular for use in carpentry, comprising a blade and a stock in a right angle relationship, wherein:
   the blade comprises at least three first holes;
   the stock comprises at least three second holes aligned with the at least three first holes;
   the blade and the stock are attached to each other by at least three fastening elements in the at least three first holes and in the at least three second holes;
   the blade comprising a rectangular main portion with two long sides and two short sides, the rectangular main portion including two of the at least three first holes, wherein the blade further comprises a supplemental portion extending from one of the long sides of the rectangular main portion and preferably in the same plane as the rectangular main portion, the supplemental portion including a third hole of the at least three first holes; and
   the stock at a first end comprises a slot accommodating a sub-portion of the rectangular main portion of the blade, wherein the slot comprises an extension extending towards a second, free end of the stock opposite the first end, which extension accommodates the supplemental portion of the blade.

* * * * *